United States Patent
Yoneyama

(10) Patent No.: US 7,145,958 B2
(45) Date of Patent: Dec. 5, 2006

(54) DIVERSITY TYPE TRANSMITTER HAVING SYSTEM FOR CONTROLLING THE DELAY TIME OF EACH OF PLURAL TRANSMISSION UNITS

(75) Inventor: Yuzo Yoneyama, Tokyo (JP)

(73) Assignee: NEC Corporation, Tokyo (JP)

( * ) Notice: Subject to any disclaimer, the term of this patent is extended or adjusted under 35 U.S.C. 154(b) by 828 days.

(21) Appl. No.: 09/870,843

(22) Filed: Jun. 1, 2001

(65) Prior Publication Data

US 2001/0050963 A1 Dec. 13, 2001

(30) Foreign Application Priority Data

Jun. 13, 2000 (JP) .............. 2000-177110

(51) Int. Cl.
H04B 7/02 (2006.01)
(52) U.S. Cl. .............. 375/267; 375/299; 375/295; 455/101; 455/91
(58) Field of Classification Search .......... 375/295, 375/267; 455/101, 91
See application file for complete search history.

(56) References Cited

U.S. PATENT DOCUMENTS

| 4,756,023 | A | * | 7/1988 | Kojima ............ 455/134 |
| 4,849,990 | A | * | 7/1989 | Ikegami et al. ........... 375/267 |
| 5,598,404 | A | * | 1/1997 | Hayashi et al. ............ 370/342 |
| 5,613,219 | A | | 3/1997 | Vogel et al. |
| 5,648,968 | A | | 7/1997 | Reudink |
| 5,764,187 | A | | 6/1998 | Rudish et al. |
| 6,038,263 | A | * | 3/2000 | Kotzin et al. ............. 375/299 |
| 6,151,328 | A | * | 11/2000 | Kwon et al. .............. 370/441 |
| 6,327,299 | B1 | * | 12/2001 | Meszko ................... 375/149 |
| 6,466,632 | B1 | * | 10/2002 | Igarashi et al. ........... 375/347 |

FOREIGN PATENT DOCUMENTS

| JP | 61-136332 A | 6/1986 |
| JP | 2-65423 | 3/1990 |
| JP | 10-28108 | 1/1998 |
| JP | 10-178375 A | 6/1998 |
| JP | 2001-257660 A | 9/2001 |

\* cited by examiner

Primary Examiner—Temesghen Ghebretinsae
Assistant Examiner—Juan Alberto Torres
(74) Attorney, Agent, or Firm—Sughrue Mion, PLLC

(57) ABSTRACT

A diversity type transmitter having system for controlling the delay time of each of plural transmission units is disclosed. Detectors detect RF output signals of transmission units, and output detection signals. A comparator compares the detection signals output from the detectors and outputs a comparison signal. On the basis of the comparison signal output from the comparator, a delay amount control circuit controls delay circuits so that the modulation timing is coincident at the transmission output terminal.

1 Claim, 8 Drawing Sheets

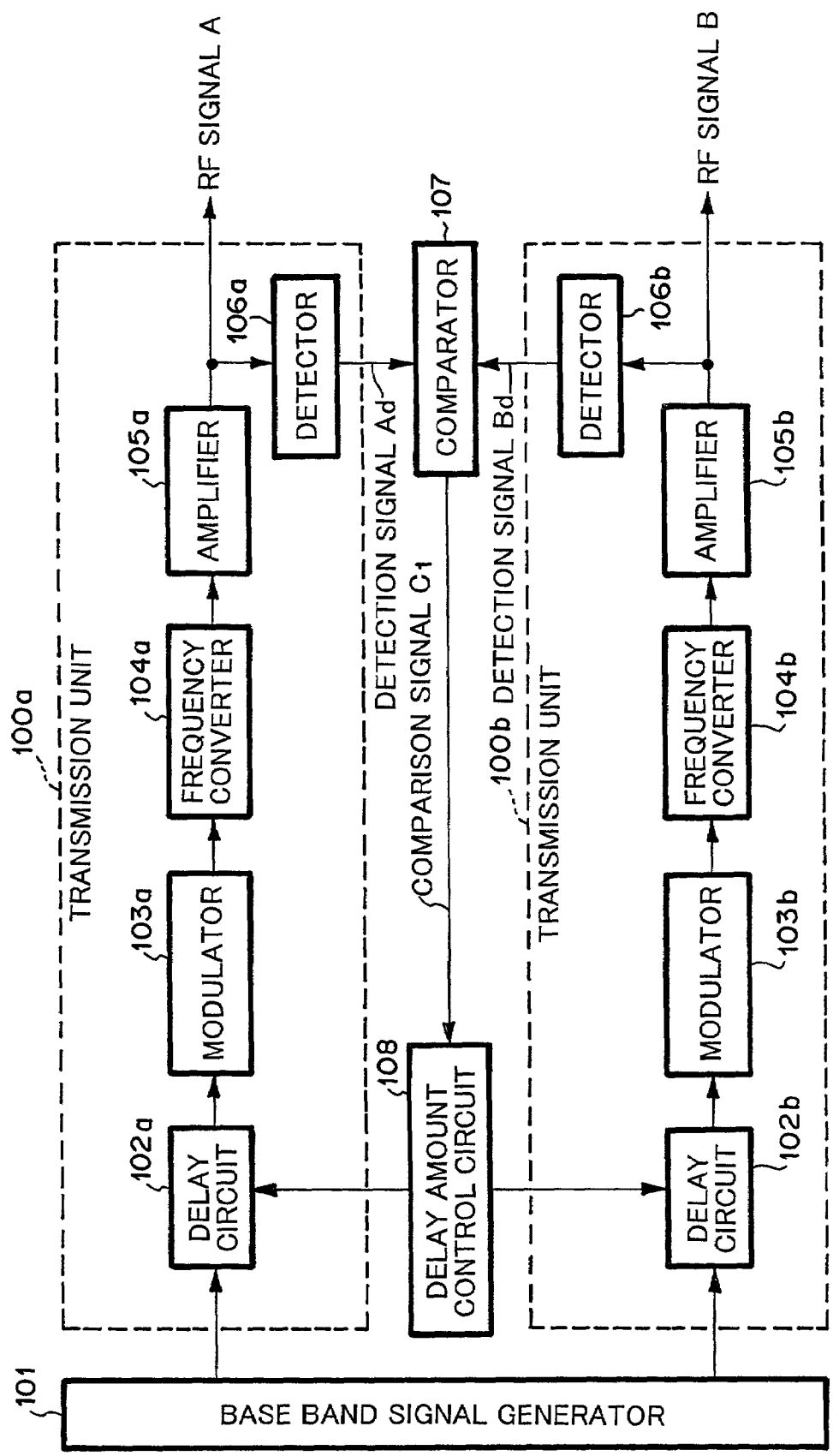

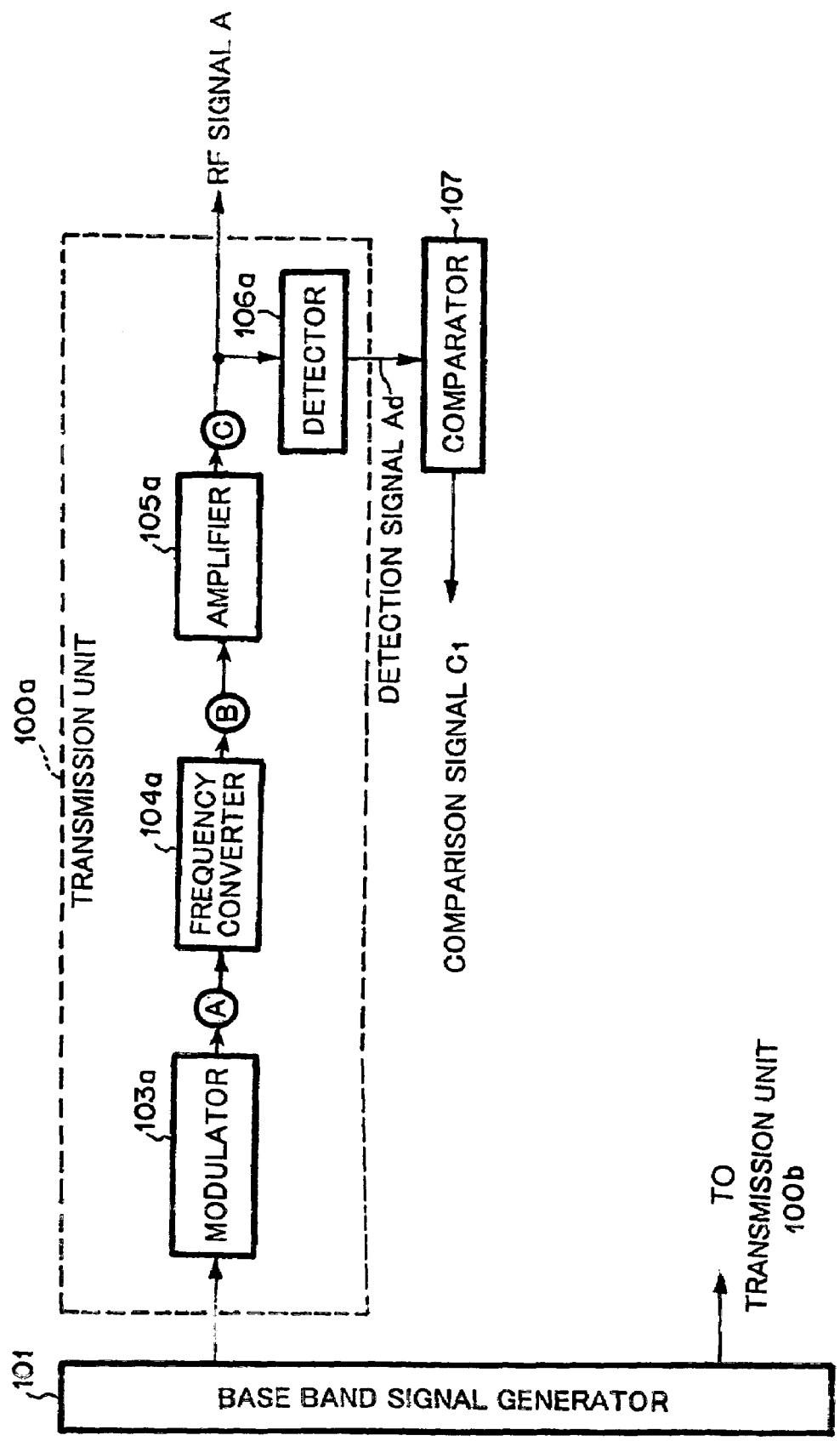

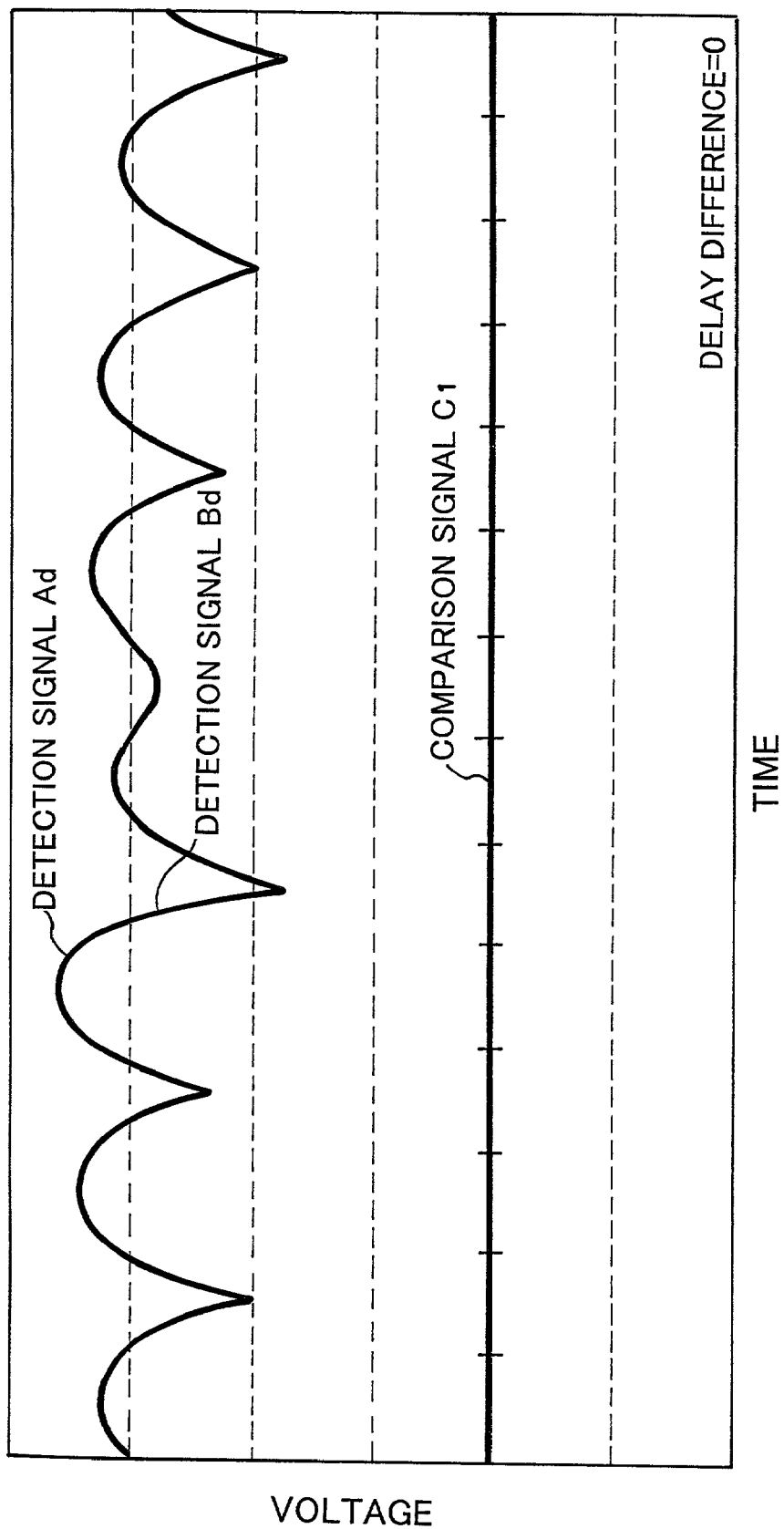

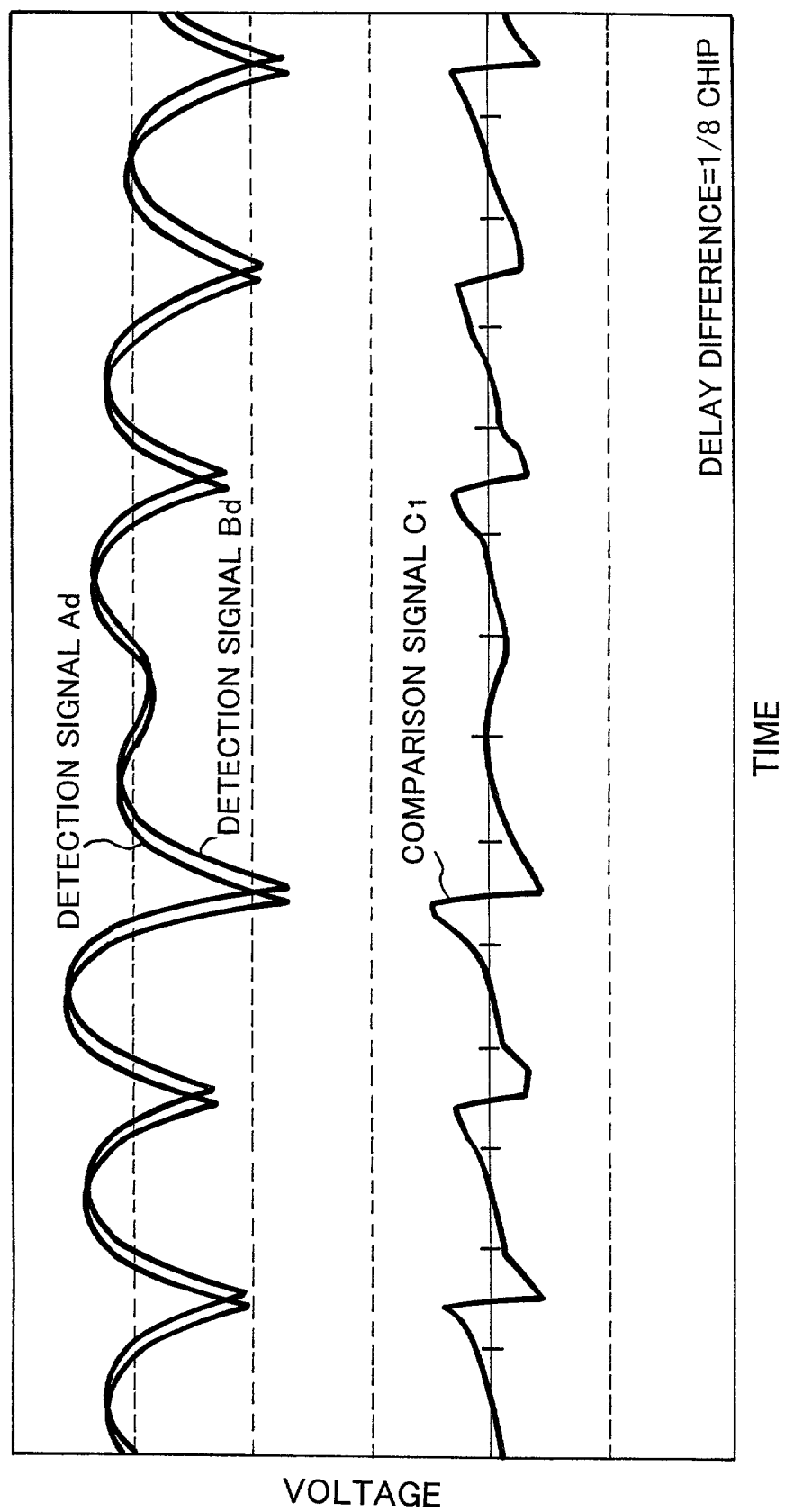

DIVERSITY TYPE TRANSMITTER HAVING SYSTEM FOR CONTROLLING THE DELAY TIME OF EACH OF PLURAL TRANSMISSION UNITS

BACKGROUND OF THE INVENTION

1. Field of the Invention

The present invention relates to a diversity type transmitter used for mobile communication and particularly, to a diversity type transmitter having a delay time control system for controlling the delay time of each of plural transmission units so that the difference in delay time among the transmission units is within a permissible value range.

2. Description of the Related Art

In a transmission diversity system in which the same modulation waves are transmitted from plural transmission units at the same time and the modulation timing is made coincident among these modulation waves at a reception point to thereby achieve a diversity gain, it is required that the modulation timing at the transmission output terminal is within a permissible value range (coincident desirably). Accordingly, it is required that plural diversity type transmission units reduce the difference in delay timing of modulated data thereof so that the difference is within a permissible value range.

Dispersion in delay time among circuit parts is considered as a factor of inducing the difference in delay time among the transmission units. Particularly, the effect of the dispersion in delay amount among IF filters to be mounted for an intermediate frequency (IF) before it is converted to RF frequency is large. Further, the effect degree of the dispersion in delay time among these IF filters is increased as the transmission rate of the modulated data (chip rate) increases. Therefore, a CDMA (Code Division Multiple Access) type mobile communication system for carrying out high-speed data transmission or the like need the control of the delay time in each transmission unit in order to implement a diversity type transmitter.

FIG. 1 is a diagram showing a transmitter used a conventional delay time control system.

According to the transmitter shown in FIG. 1, signals generated by base band signal generator 101 are delayed by delay circuits 102a and 102b of transmission units 100a and 100b, passed through modulators 103a and 103b, frequency converters 104a and 104b and amplifiers 105a and 105b, and then finally output as RF (Radio Frequency) signals A and B. In order to control the delay amount of the signals, delay amount control circuit 108 controls the delay amount with delay amount set value 109 which is calculated in advance. The delay amount set value 109 is calculated by measuring the delay amounts of the transmission units 100a and 100b which are actually used.

In the transmitter described above, the delay amounts of the transmission units must be actually measured in order to achieve the delay amount set value 109, and thus the productive efficiency is low. The delay amount set value 109 is set only at the time when a diversity type transmitter is produced. Therefore, when the difference in delay amount is varied due to a temperature variation or a secular change under operation, an expected diversity gain may not be obtained.

SUMMARY OF THE INVENTION

An object of the present invention is to provide a transmitter which can improve the productive efficiency and achieve an expected diversity gain even when a temperature variation or a secular change under operation occurs.

In order to attain the above object, according to the present invention, a transmission diversity type transmitter in which the same modulation waves are transmitted from plural transmission units at the same time by delaying a base band signal with delay circuits, and the modulation timing is made coincident among the modulation waves at a reception point to achieve a diversity gain, the transmitter comprising:

a detector for detecting an RF signal of each transmission unit and outputting a detection signal, a comparator for comparing the detection signals output from the two detectors of two transmission units in the plural transmission units and outputting a comparison signal, and a delay amount control circuit for controlling the delay circuits of the two transmission units on the basis of the comparison signal output from the comparator so that the modulation timing is coincident at the transmission output terminals of the two transmission units.

BRIEF DESCRIPTION OF THE DRAWINGS

FIG. 2 is a block diagram showing a first embodiment of a transmitter according to the present invention;

FIG. 2a is a block diagram showing alternate embodiments of a transmitter according to the present invention;

FIG. 3 is a graph showing examples of detection signals of detectors 106a and 106b of FIG. 2;

FIG. 4 is a graph showing another examples of the detection signals of the detectors 106a and 106b of FIG. 2;

DETAILED DESCRIPTION OF THE PREFERRED EMBODIMENTS

Preferred embodiments according to the present invention will be described hereunder with reference to the accompanying drawings.

First Embodiment

FIG. 2 is a block diagram showing a first embodiment of a transmitter according to the present invention.

Figure 1:
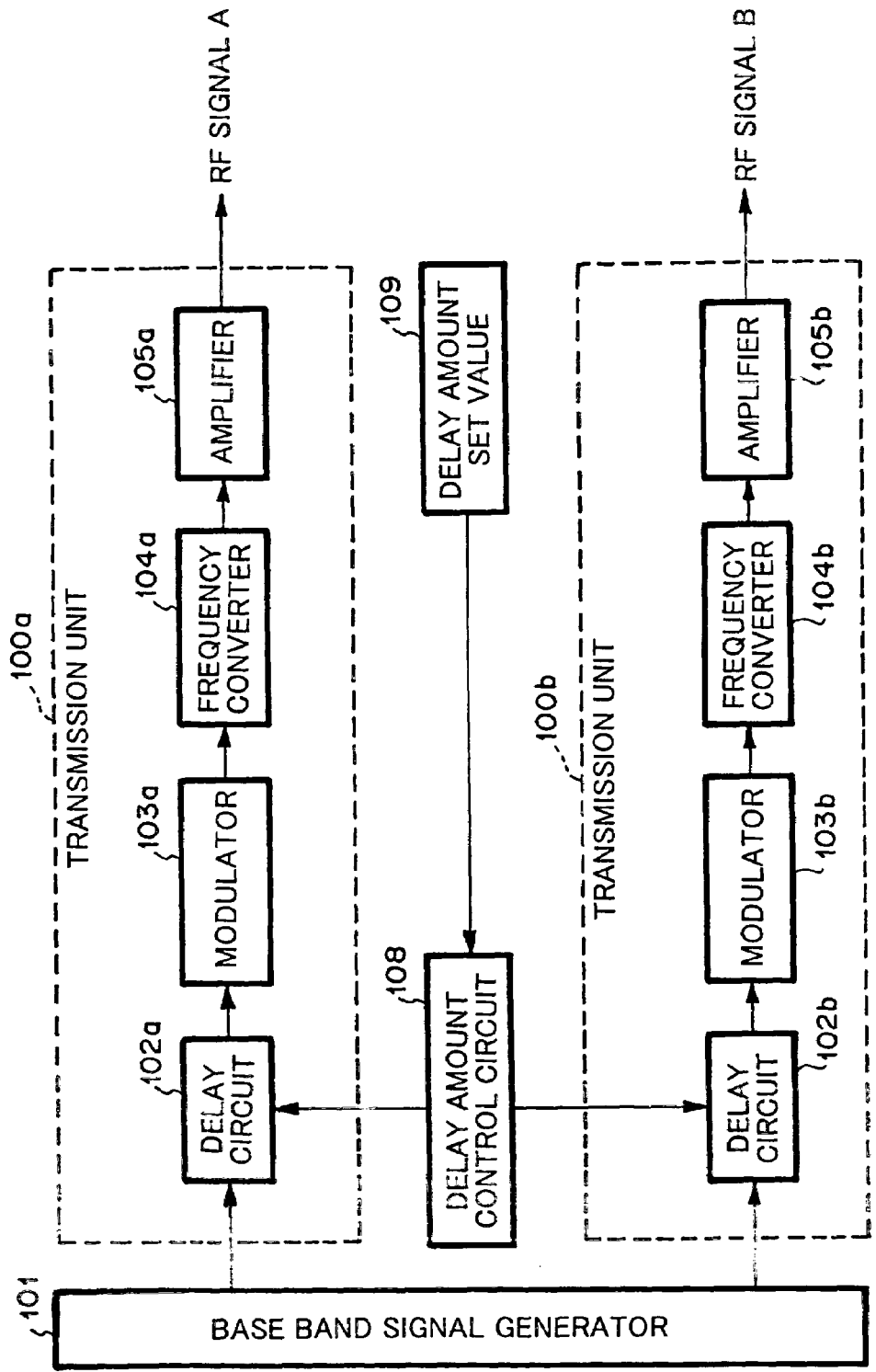
FIG. 1 is a block diagram showing a transmitter having a conventional delay time control system.

FIG. 2 shows a diversity type transmitter comprising two transmission units, and the same parts as shown in FIG. 1 are represented by the same reference numerals.

In FIG. 2, a base band signal generated in a base band signal generator 101 is input to two transmission units 100a and 100b. The base band signals input to the transmission units 100a and 100b are passed through delay circuits 102a and 102b, and then input to modulators 103a and 103b. The modulator 103a and 103b generate modulation waves from the base band signals input thereto. The modulation waves are converted to RF signals in frequency converters 104a and 104b, amplified by amplifiers 105a and 105b so as to have predetermined power, and then output as RF (Radio Frequency) signals A and B from the transmission units 100a and 100b.

FIG. 2a shows alternative connections A, B and C for the delay circuits 102a and 102b. For alternative connection at position A, a base band signal generated in a base band signal generator 101 is input to two transmission units 100a and 100b. The base band signals input to the transmission units 100a and 100b are input to modulators 103a and 103b. The modulator 103a and 103b generate modulation waves from the base band signals input thereto. The modulation waves are passed through delay circuits 102a and 102b, and then converted to RF signals in frequency converters 104a and 104b, amplified by amplifiers 105a and 105b so as to have predetermined power, and then output as RF (Radio Frequency) signals A and B from the transmission units 100a and 100b.

For alternative connection at position B, a base band signal generated in a base band signal generator 101 is input to two transmission units 100a and 100b. The base band signals input to the transmission units 100a and 100b are input to modulators 103a and 103b. The modulator 103a and 103b generate modulation waves from the base band signals input thereto. The modulation waves are converted to RF signals in frequency converters 104a and 104b. The RF signals are then passed through delay circuits 102a and 102b, and then amplified by amplifiers 105a and 105b so as to have predetermined power, and then output as RF (Radio Frequency) signals A and B from the transmission units 100a and 100b.

For alternative connection at position C, a base band signal generated in a base band signal generator 101 is input to two transmission units 100a and 100b. The base band signals input to the transmission units 100a and 100b are input to modulators 103a and 103b. The modulator 103a and 103b generate modulation waves from the base band signals input thereto. The modulation waves are converted to RF signals in frequency converters 104a and 104b. The RF signals are then amplified by amplifiers 105a and 105b so as to have predetermined power, and then passed through delay circuits 102a and 102b, and then output as RF (Radio Frequency) signals A and B from the transmission units 100a and 100b.

The detectors 106a and 106b detect the RF output signals A and B of the trans-mission units 100a and 100b thereof, and output detection signals Ad and Bd. In comparator 107, the detection signals Ad and Bd of the detectors 106a and 106b are compared with each other to output a comparison signal $C_1$. In delay amount control circuit 108, the delay amounts of the delay circuits 102a and 102b, at any of the positions (FIG. 2 or A, B or C of FIG. 2a), of the respective transmission units are controlled on the basis of the comparison signal $C_1$ as information. The control is automatically carried out so that the difference in delay time between the transmission units 100a and 100b is converged to a permissible value range. It is judged on the basis of the comparison signal $C_1$ from the comparator 107 whether the difference in delay time between the transmission units 100a and 100b is within the permissible value range.

A dispersion in delay time between circuit parts is considered as a factor inducing the difference in delay time between the transmission units. Particularly, the effect of the dispersion in delay amount among IF filters to be mounted for an intermediate frequency (IF) before it is converted to RF frequency is large. Further, the effect degree of the dispersion in delay time among these IF filters is increased as the transmission rate of the modulated data (chip rate) increases. Therefore, a CDMA type mobile communication system for carrying out high-speed data transmission or the like need the control of the delay time in each transmission unit in order to implement a diversity type transmitter.

Next, the operation will be described.

Since the RF signal is a modulation wave, the output power thereof is instantaneously varied at a rate proportional to the transmission rate of the modulation data (base band signal). Each of the detectors 106a and 106b outputs the instantaneous power variation of the RF signal as a detection voltage.

Figure 5:
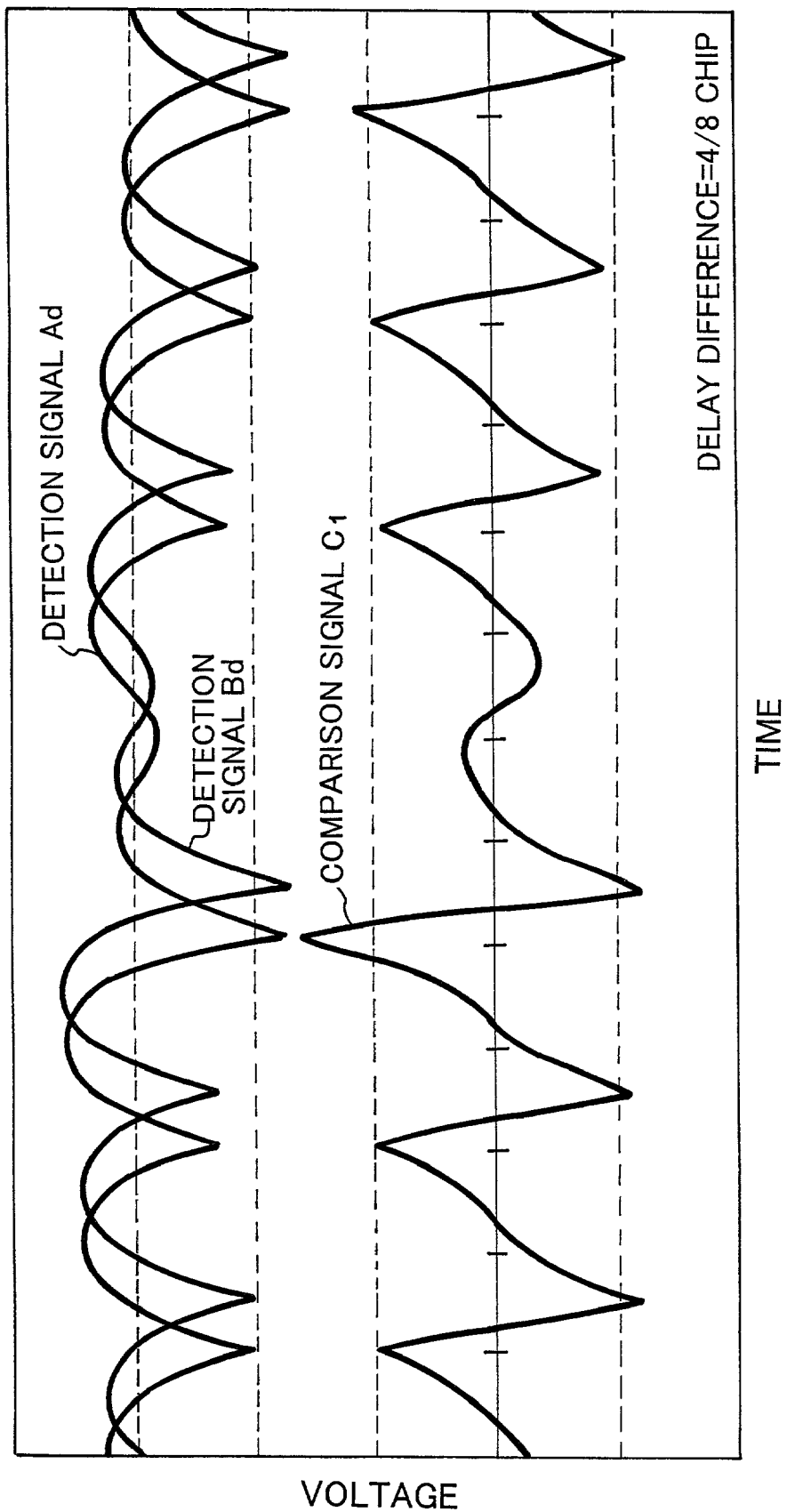
FIG. 5 is a graph showing another examples of the detection signals of the detectors 106a and 106b of FIG. 2.

FIGS. 3 to 5 show detection signals Ad and Bd of the detectors 106a and 106b of the respective transmission units. Comparison signal $C_1$ is the difference signal between the detection signals Ad and Bd. The ordinate represents the detection voltage and the abscissa represents the time normalized on the basis of the transmission rate unit (chip). One scale of the abscissa represents the time of one chip.

FIG. 3 is a graph showing the detection signals Ad and Bd when the difference in delay time between the transmission unit 100a and the transmission unit 100b is equal to zero. Since no difference occurs in delay time, the same amplitude variation occurs at the same time. Therefore, the detection signal Ad corresponding to the output signal of the detector 106a and the detection signal Bd corresponding to the output signal of the detector 106b are overlapped with each other.

FIGS. 4 and 5 show the detection signals Ad and Bd when there occurs a difference in delay time between the transmission unit 100a and the transmission unit 100b. FIG. 4 shows a case where the transmission unit 100a is delayed by ⅛ chip to the transmission unit 100b, and FIG. 5 shows a case where the transmission unit 100a is delayed by ⅘ chip to the transmission unit 100b.

Next, the comparison signal output from the comparator 107 will be described.

The comparator 107 compares the detection signal Ad and the detection signal Bd with each other, and outputs the difference between the detection signals Ad and Bd (detection signal Ad—detection signal Bd). FIGS. 3 to 5 show the comparison signal $C_1$ as the difference between the detection signals Ad and Bd.

In FIG. 3, the detection signal Ad and the detection signal Bd take the same value as the same time because no difference exists in delay time between the transmission units. Therefore, the comparison signal $C_1$ is equal to zero. On the other hand, as shown in FIGS. 4 and 5, when there occurs a difference in delay time between the transmission units, the comparison signal $C_1$ is not equal to zero. As the difference in delay time is increased, the amplitude variation of the comparison signal is intensified.

The comparison signal $C_1$ obtained by the comparator 107 is input to the delay amount control circuit 108 to control the delay amounts of the delay circuits 102a and 102b provided to the transmission unit 100a and 100b.

Next, the operation of the delay amount control circuit 108 will be described with the flowchart of FIG. 6.

Figure 6:
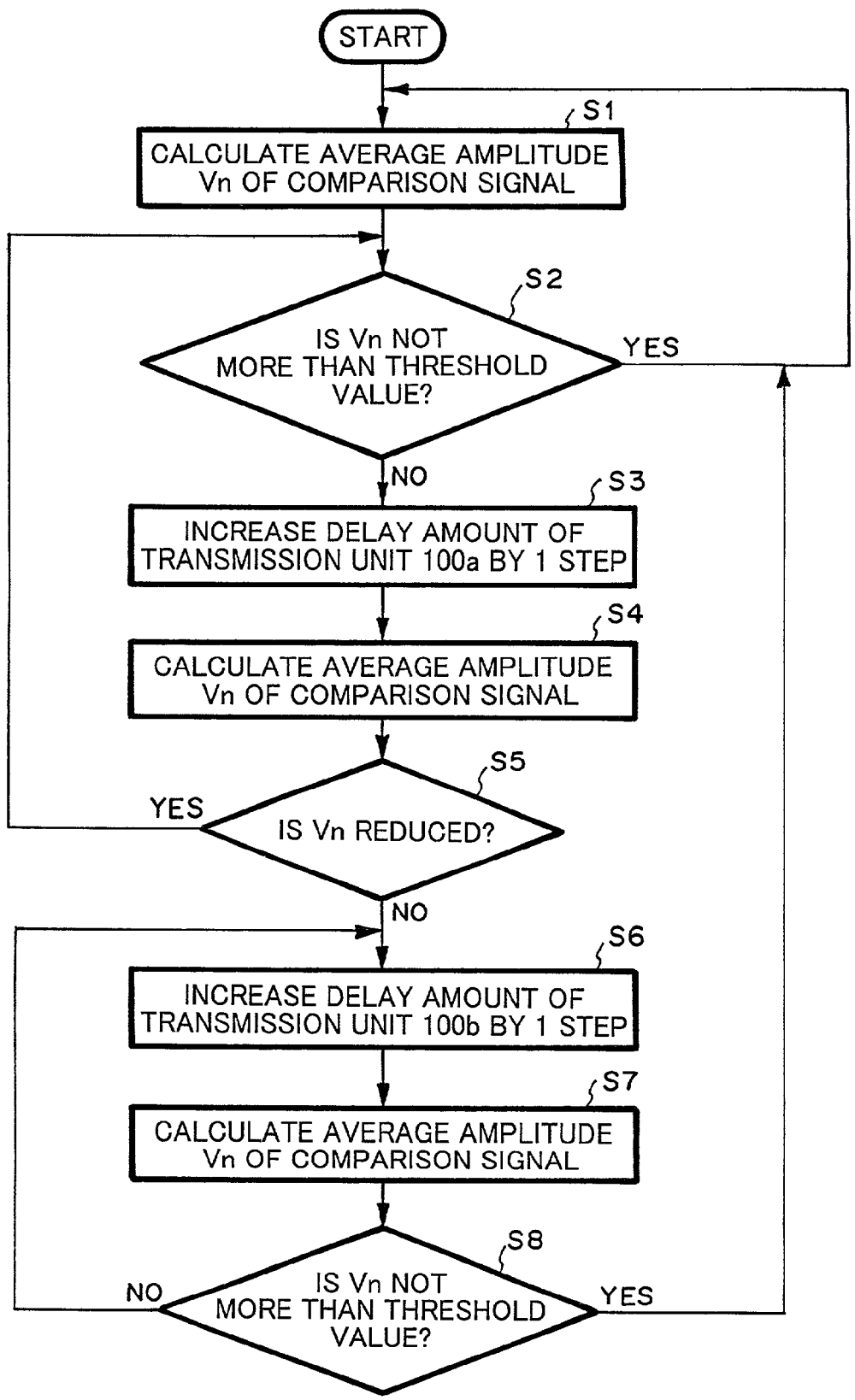
FIG. 6 is a flowchart showing the operation of a delay amount control circuit 108 of FIG. 2.

FIG. 6 is a flowchart showing the operation of the delay amount control circuit 108.

The delay amount control circuit 108 calculates the average amplitude Vn of the comparison signal input from the comparator 107 (step S1), and compares the average amplitude Vn with a predetermined threshold value (step S2). When the average amplitude Vn of the comparison signal is smaller than the threshold value, no control is carried out, and the processing returns to the step S1 to calculate the average amplitude of the comparison signal again. Accordingly, if the average amplitude Vn is not larger than the threshold value, the average amplitude of the comparison signal is re-calculated.

The threshold value is preset as follows. When the difference in delay time between the transmission units is large, the transmission diversity characteristic is deteriorated.

Therefore, the permissible difference in delay time between the transmission units is set. As shown in FIGS. 3 to 5, the amplitude variation of the comparison signal output from the comparator 107 is proportional to the difference in delay time. Accordingly, the permissible difference in delay time can be replaced by the value of the average amplitude of the comparison signal, and the value can be set as the threshold value.

On the other hand, if the average amplitude Vn of the comparison signal is larger than the threshold value, the delay amount of the transmission unit 100a is increased by one step (step S3). Here, as shown in FIGS. 4 and 5, as the transmission unit 100a has a delay time larger than the transmission unit 100b, the delay time is further increased, and the average amplitude Vn of the comparison signal is also larger. Therefore, after the delay amount of the transmission unit 100a is increased by one step, the average amplitude Vn of the comparison signal is calculated again, and it is judged whether the average amplitude Vn is reduced (step S5). If the average amplitude Vn is reduced, the processing returns to the step S2 to judge again whether the value of Vn is smaller than the threshold value. On the other hand, if the average amplitude Vn is increased, the delay amount of the transmission unit 100b is increased by one step (step S6), the average amplitude Vn of the comparison signal is calculated again (step S7) and then it is judged whether the average amplitude Vn is smaller than the threshold value (step S8).

Subsequently, the control is repetitively carried out until the average amplitude Vn is equal to or smaller than the threshold value. As a result, the control is automatically carried out so that the difference in delay time between the transmission units is equal to a permissible value or less.

As described above, according to the present invention, the control is automatically carried out so that the difference in delay time between the diversity type transmitters is equal to a permissible value or less. Accordingly, an expected transmission diversity characteristic can be achieved at all times.

Further, according to the present invention, the dispersion of circuit parts used in the respective transmission units can be automatically corrected. In addition, the deterioration of the transmission diversity characteristic due to the temperature variation and the secular change under operation can be prevented.

Second Embodiment

Figure 7:
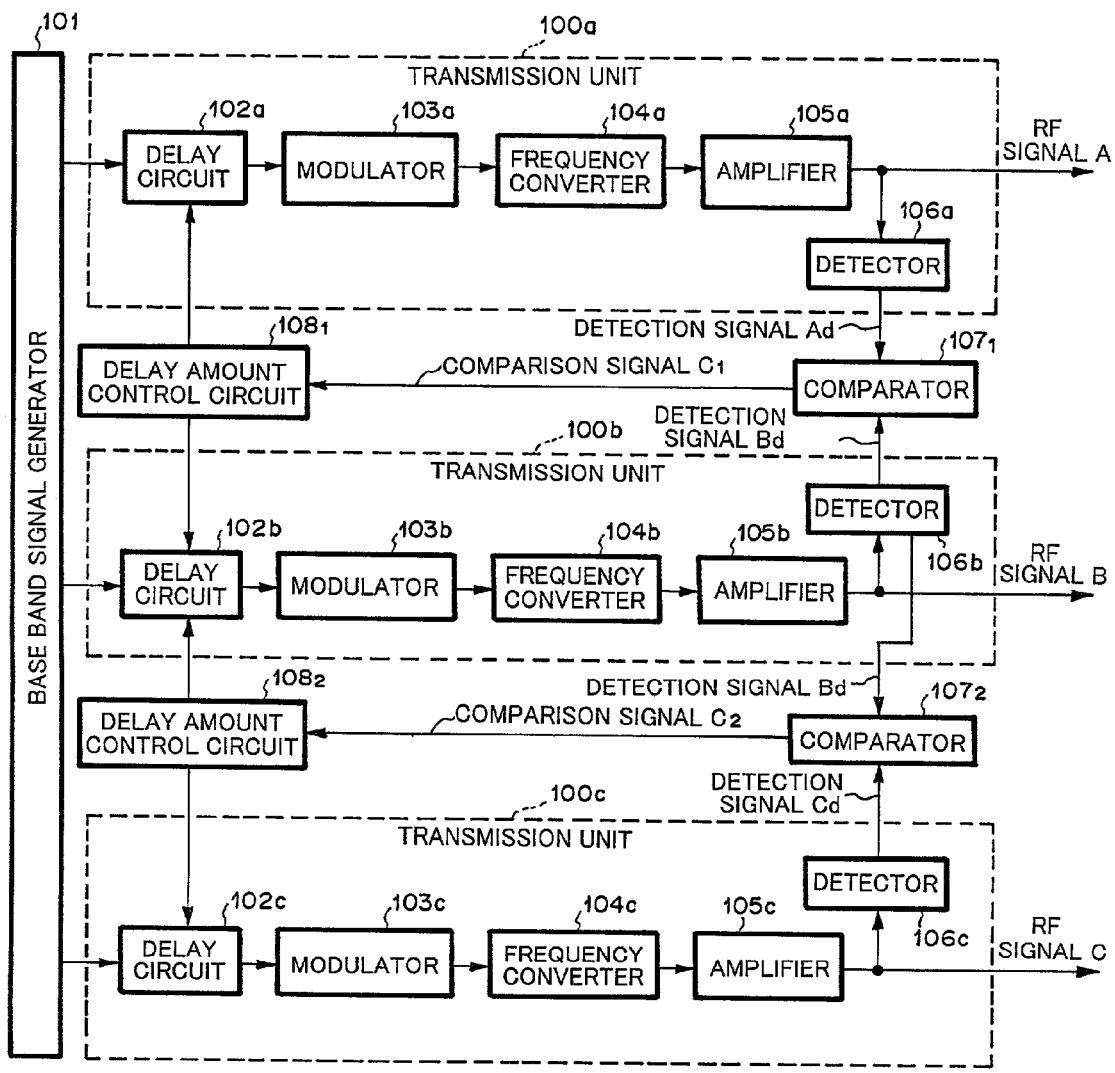
FIG. 7 is a block diagram showing a second embodiment of the transmitter according to the present invention.

FIG. 7 is a block diagram showing a second embodiment of the transmitter according to the present invention.

The transmitter of FIG. 7 includes three transmission units 100a, 100b and 100c, and each transmission unit is designed in a similar construction to that of FIG. 2.

In FIG. 7, a base band signal generated in a base band signal generator 101 is input to two transmission units 100a, 100b and 100c. The base band signals input to the transmission units 100a, 100b and 100c are passed through delay circuits 102a, 102b and 102c, and then input to modulators 103a, 103b and 103c. The modulator 103a, 103b and 103c generate modulation waves from the base band signals input thereto. The modulation waves are converted to RF signals in frequency converters 104a, 104b and 104c, amplified by amplifiers 105a, 105b and 105c so as to have predetermined power, and then output as RF (Radio Frequency) signals A, B and C from the transmission units 100a, 100b and 100c.

The detectors 106a and 106b detect the RF output signals A and B of the transmission units 100a and 100b, and output detection signals Ad and Bd. In comparator $107_1$, the detection signals Ad and Bd of the detectors 106a and 106b are compared with each other to output comparison signal $C_1$. In delay amount control circuit $108_1$, the delay amounts of the delay circuits 102a and 102b of the respective transmission units are controlled on the basis of the comparison signal $C_1$ as information.

Further, detector 106c detects the RF output signal C of transmission unit 100c, and output detection signal Cd. In comparator $107_2$, the detection signals Bd and Cd of the detectors 106b and 106c are compared with each other to output comparison signal $C_2$. In delay amount control circuit $108_2$, the delay amounts of the delay circuits 102b and 102c of the respective transmission units are controlled on the basis of the comparison signal $C_2$ as information.

Consequently, the RF signal A and the RF signal B are compared in delay time by a comparator $107_1$ while the RF signal B and the RF signal C are compared in delay time by comparator $107_2$, and delay control circuits $108_1$ and $108_2$ control the delay circuits 102a and 102b and the delay circuits 102b and 102c so that the difference in delay time is suppressed to each predetermined threshold value or less.

Other Embodiments

The second embodiment relates to the transmitter including three transmission units. However, even when a diversity transmitter includes four or more transmission units, the delay amounts of respective two transmission units are compared with each other (when n is an integer larger than 1, the number of the transmission units is equal to n, and the number of the comparators and the number of the delay amount control circuits are equal to n−1, respectively), whereby the difference in delay amount between the respective transmission units can be suppressed to each threshold value or less.

Further, in the above embodiments, the delay circuit is disposed in front of the modulator (that is, at the end to which the base band signal is input), however, the delay circuit may be disposed at the output side of the amplifier to control the delay amount. Also, the delay circuit may be disposed between the modulator and the frequency converter or between the frequency converter and the amplifier to control the delay amount. The detector is disposed in the transmission unit, however, the detector may be disposed out the transmission unit.

Further, the same control operation can be performed even when the base band signal is transmitted while being subjected to ON/OFF control, and a method of comparing the rise-up timing and the falling timing of the detection output at the ON/OFF-control time by the comparator and controlling the delay circuits by the delay amount control circuit so that the difference therebetween can be converged to a permissible time range can be used.

As described above, according to the present invention, the detection signals output from the detectors of the two transmission units are compared with each other to control the delay amount, whereby the control can be automatically performed so that the difference in delay time between the diversity type transmission units can be reduced to a permissible value or less. Therefore, an expected transmission diversity characteristic can be achieved.

Further, the dispersion of circuit parts used for the respective transmission units can be automatically corrected, and the deterioration of the transmission diversity characteristic due to the temperature variation and the secular change under operation can be prevented.

What is claimed is:

1. A transmission diversity type transmitter in which the same modulation waves are transmitted from transmission units at the same time by delaying a base band signal with delay circuits, and modulation timing is made coincident among the modulation waves at a reception point to achieve a diversity gain, the transmitter comprising:

a detector for detecting an RF signal of each transmission unit and outputting a detection signal, a comparator for comparing detection signals output from two detectors of two transmission units in said plural transmission units and outputting a comparison signal, and a delay amount control circuit for controlling the delay circuits of said two transmission units on the basis of the comparison signal output from said comparator so that the modulation timing is coincident at transmission output terminals of said two transmission units, wherein the base band signal is subjected to ON/OFF control, the rising timing and falling timing of the detection output when the ON/OFF control is carried out are compared with each other by said comparator, and said delay circuits are controlled by said delay amount control circuit so that the difference between the rising timing and the falling timing is within a permissible time range.

* * * * *